(12) United States Patent
Wanders

(10) Patent No.: US 6,409,339 B1
(45) Date of Patent: *Jun. 25, 2002

(54) MULTIFOCAL LENS, AND METHOD FOR PRODUCTION THEREOF

(75) Inventor: Bernardus Franciscus Maria Wanders, Angerlo (NL)

(73) Assignee: Procornea Holdings B.V., Eerbeek (NL)

(*) Notice: Subject to any disclaimer, the term of this patent is extended or adjusted under 35 U.S.C. 154(b) by 40 days.

This patent is subject to a terminal disclaimer.

(21) Appl. No.: 09/595,208

(22) Filed: Jun. 16, 2000

Related U.S. Application Data

(63) Continuation-in-part of application No. 09/066,386, filed as application No. PCT/NL96/00428 on Oct. 31, 1996, now Pat. No. 6,092,899.

(30) Foreign Application Priority Data

Oct. 31, 1995 (NL) .............................................. 1001540
May 17, 1996 (NL) .............................................. 1003158

(51) Int. Cl.[7] .............................. G02C 7/04; A61F 2/16
(52) U.S. Cl. ...................................... 351/161; 623/6.24
(58) Field of Search ................................ 351/161, 177, 351/160 H, 160 R, 162; 623/6.24

(56) References Cited

U.S. PATENT DOCUMENTS

| 4,573,775 A | | 3/1986 | Bayshore |
| 4,854,089 A | | 8/1989 | Morales |
| 4,923,296 A | * | 5/1990 | Erickson ..................... 351/161 |
| 6,092,899 A | * | 7/2000 | Wanders ..................... 351/161 |

FOREIGN PATENT DOCUMENTS

| DE | 7034876 | 11/1974 |
| EP | 42023 | 12/1981 |
| EP | 452549 | 10/1991 |
| GB | 2033101 | 5/1980 |
| WO | WO8907281 | 8/1989 |

* cited by examiner

Primary Examiner—Scott J. Sugarman
(74) Attorney, Agent, or Firm—Handal & Morofsky

(57) ABSTRACT

Multifocal lens provided with a reading part disposed near the bottom part and another lens, such as a distance lens, near the top part. According to the invention, the outer limit of the reading part lies on or within the (outer) radius RV of the remaining part of the lens. This means that no thickening is needed for the reading part, and a particularly gradual transition between reading and distance part can be provided.

27 Claims, 4 Drawing Sheets

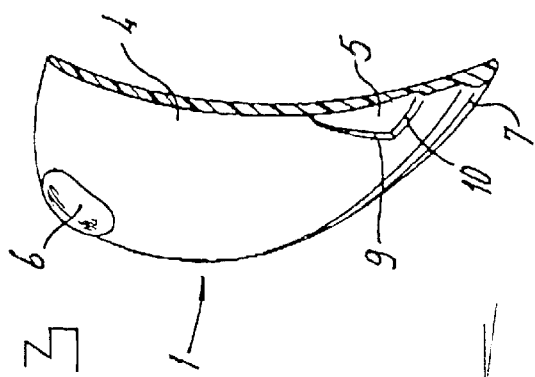
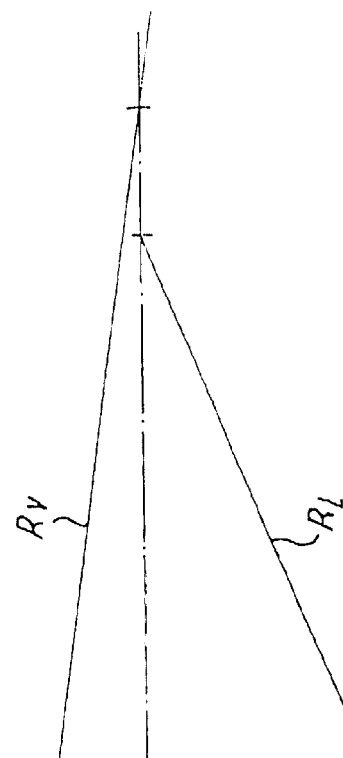
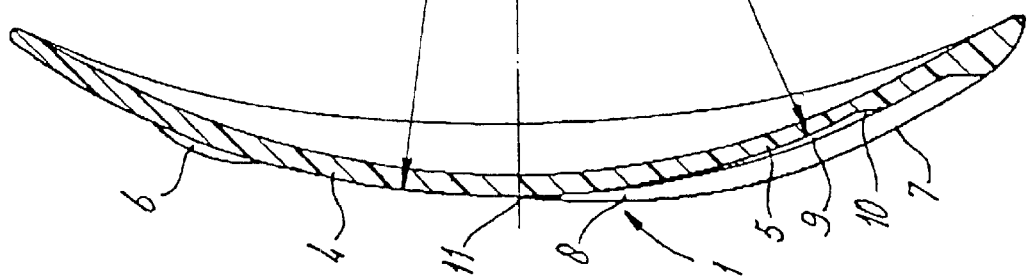

MULTIFOCAL LENS, AND METHOD FOR PRODUCTION THEREOF

CROSS-REFERENCE TO A RELATED APPLICATION

This application is a continuation-in-part of the present inventor's application number 09/066,386 filed Apr. 9, 1998, now U.S. Pat. No. 6,092,899 the disclosure of which is hereby incorporated herein by reference thereto.

FIELD OF THE INVENTION

The invention relates to a multifocal lens, having a reading part in the bottom part and another lens in the top part. This lens can be a hard or soft contact lens as well as an intra ocular lens.

BACKGROUND OF THE INVENTION

A multifocal lens is known from U.S. Pat. No. 4,854,089. In the general prior art it is known to provide a part with smaller radius of curvature in the centre of the lens. This part with smaller radius of curvature is, as it were, placed on a larger part with a larger radius of curvature. This is a rotationally symmetrical lens where there is no need for stabilizing means. Due to the fact that there is a kink at the position of the $R_{lecs}-R_{verte}$ (reading-distance) transition, a great deal of reflection occurs in the direction of the optical axis, which means that the optical characteristics of this lens are inadequate.

Designs are also known from the prior art in which a reading part is moulded or cast into the lens material, or is disposed on the front side in a half moon shape. Such systems can work only if the lens can move fully from distant to close up. The reading part covers about 50% of the pupil if the lens is centred on the cornea. In order to obtain an undistorted image, the lens will have to move downwards until it is at or below the lower eyelid. The lens has to move up again for reading. These systems are characterized in that the optical axes do not lie level, with the result that an image discontinuity always occurs. This causes an unsteady image for the wearer, and leads to complaints of double vision and shadow images.

In another system (tangent streak) the optical axis does remain level. It lies precisely in the centre of the lens. The disadvantage of this lens is that the distance/close-up division is always 50%. The lens is divided exactly into two halves. This optical system is characterized in that the two outer radii for the reading and distance part are monocurved, i.e. they are spherical from the centre to the edge. This produces a very thick lens. This design also means that at the edge quite a large height difference arises between the two curves. Both have a very negative influence on wearing and vision comfort.

On the other hand, the reading part on the lens is designed as a sort of half moon. The characteristic feature of this lens is the enormous image discontinuity which occurs. The reason for this lies in the fact that the lens has to be prismatic, in order to obtain a stable position on the eye, on the one hand, and in order to leave sufficient material to be able to make the reading part, on the other hand, This prismatic effect is present optically in the distance part. However, the reading part is not provided in the second instance with prism effect. The optical centre points do not lie on the optical axis, nor can they be joined tangentially in the centre. A further disadvantage is that the shape of the 'half moon' on the front side, which is the reading part, is not adjustable. This is a resultant. The dimensions of this part are different in the case of each lens power combination, with the result that much too large a reading part and too small a distance zone are produced. The consequence is that this lens has many reflections for the user. The lens requires a great vertical movement in order to function. This causes a high degree of discomfort for the user.

It is therefore the object of the present invention to provide a multifocal lens which has bivisual features, without the presence of a kink or similar transition which causes troublesome reflections in the direction of the optical axis or an image discontinuity, and which lens has such features that no great movement on the cornea is needed for fulfilment of the distance and reading functions.

SUMMARY OF THE INVENTION

According to one aspect of the invention, a multifocal lens is provided with a reading portion in the lower lens part and another lens portion in its upper part, wherein the reading portion comprises a recess which is bounded on all sides by the remaining lens part, and in that the outer limit of the reading portion lies on or within an imaginary sphere having its origin and radius of curvature coinciding with the radius $R_v$ of said other lens portion.

The reading part is taken from the remaining part of the lens, i.e. instead of the lens being provided with a thickening for the reading part, it is provided with a thinner part or recess. This means that an extremely gradual transition between reading and distance part can be provided, with the result that irritation, image discontinuity and reflection are avoided. The lens need not move any more than an ordinary monofocal lens, because the distance/close-up ratio in the lens system can be selected in the optimum way. A ratio with 30–40% reading part and 60–70% distance part is a good value. In some cases where lenses are in a low position on the eye, another ratio, for example 50% reading and 50% distance, can give a better solution. The size and position and shape of the zones can be tailored exactly by the invention to the needs of the lens wearer. There is no transition in the centre of the lens because the two curves merge into each other at the position of the transition, i.e. the angle at which the two curves touch each other is the same. The height difference at a occurring further position in the surface is reduced sinusoidally without an optically appreciable effect, or is reduced in such a way that optically an effectively working intermediate zone is produced. An optically working transition zone is then produced between sectors with multifocal effect. This means that a lens can be made extremely thin, so that the oxygen permeability of the lens is also optimal. At the outer periphery of the lens, it will have the dimensions of the remaining part of the lens surface, i.e. there will be a transition zone between the outer periphery of the lens and the reading part. Irritation is avoided in this way.

According to a further aspect of the invention, provision is made for a multifocal lens which is provided with a reading part in the usual way at the bottom side. According to an further aspect of the invention, at least one additional reading part, which is disposed opposite (relative to the axis of the lens) the first reading part is provided. This means that the stabilization of the lens is less critical, or may even be superfluous. This additional reading part can have the same power as or a different power from the first reading part.

Location of the lens is of course of importance. In a contact lens to that end stabilisations means are provided. According to a further aspect of the invention, the lens does comprise an intra ocular lens which is positioned through locating means in the lens cavity of the eye.

Such a lens is preferably provided with the position-stabilizing means to be described below, but it must be understood that it is also possible to work with other position-stabilizing means known in the prior art. It has been found that the human eye becomes accustomed to the presence of such a second reading part, so that the position of the lens on the eye becomes less critical.

Both the reading part and the distance part are preferably symmetrical relative to the vertical axis of the lens in the use position Moreover, a transition zone, comprising 10–30% of the surface area of the distance part, is preferably present between the reading part and the distance part.

The position-stabilizing means described above can comprise any designs known in the art. With bifocal lenses and other lenses which are not rotationally symmetrical, it is important in some way to fix the position of such a lens on the cornea. In the abovementioned European patent application it is proposed that elevations should be disposed on the horizontal axis of symmetry. This achieves stabilization each time that the eyelids are closed. The height of such elevations relative to the remaining part of the lens lies between 0.1 and 0.2 mm.

The condition for proper functioning of such a design is that the user must close his eyelids sufficiently often.

In this case, stabilization of the lens occurs only during the closing movement of the eyes, and no correction occurs when the eyes are open. If the time between two blinks is relatively long, such stabilization does not work properly.

Reduction of the height has proved not to be possible, because in that case it cannot be ensured adequately that the lens will always be in the correct position. That is why such lenses have not become generally accepted.

Use of ridges is not possible in the case of the relatively smaller, so-called hard contact lens, because such a lens rests freely on the lower eyelid.

In order to obtain sufficient mass, the thickenings are designed with considerable height and width. This leads to irritation of the lower eyelid. In order to avoid this problem, it is proposed that other types of thickenings, such as prisms, should be provided in the contact lens. The prism results not only in a considerable increase in thickness in the bottom pat of the lens, but also leads to a so-called optical image height discontinuity, where the user receives an optical height difference relative to the other eye. This difference can be as much as 2 cm per metre, and is particularly troublesome. Owing to the fact that the thickness of the lens increases, the oxygen permeability and wearing comfort will be reduced.

Improved stabilization of the contact lens is obtained according. to the invention in that:

said elevations are provided above the horizontal axis of the lens, said elevations have a height of between 0.05 and 0.1 mm, and further stabilizing means are present, disposed in the bottom part of the lens and comprising a part with increased weight.

Both dynamic and static stabilization are obtained with the currently proposed design The dynamic stabilization is achieved by the elevations, However, in contrast to the prior art, these elevations are relatively small in size because, if the position for these elevations is chosen too high up, the lens will no longer move towards a central position after the blink, due to the fact that the upper eyelid will hold the lens. The relatively low elevations mean that no irritation will be experienced. The weight-increasing stabilizing means serve for static stabilization. The latter can likewise be made more limited, so that, the abovementioned disadvantages connected with them do not occur.

Positioning the ridges above the horizontal axis ensures that a secure position orientation is obtained at all times, owing to the fact that said ridges always rest lightly against the upper eyelid or sit slightly below it. This also means that when the eye is open the lens in combination with the heavier part in the bottom thereof will remain in position. It has also been found that the upper eyelids make a greater sweep than the lower eyelids, and consequently largely cover the lens during a blink. In the case of hard lenses in particular, i.e. lenses with relatively small diameter, elevations above the horizontal axis are advantageous, because said elevations are not or are barely reached by the lower eyelid.

The static stabilizing means described above can be all types known in the prior art, such as ridges and prisms. Furthermore, they can be in the form of the peripheral edge thickening. Combinations of these variants are possible.

Since a peripheral edge thickening can have a lower weight on account of the presence of the dynamic stabilizing means, provision can be made for a transition zone between the peripheral edge thickening and the remaining part of the lens. This means that irritation is not longer encountered as a result of the abrupt transition. However, in the construction according to this German utility model such a transition is unavoidable because of the amount of mass which has to be put into the peripheral edge thickening.

This transition zone can be a sinusoidal shape, i.e. the transitions are extremely smooth.

The height of the peripheral edge thickening preferably lies between 0.1 and 0.4 mm.

The transition zone of the peripheral edge thickening described above can be relatively long, and can lie between +70–0° and 270°, while the vertical axis is 90–270°. Of course, the mirror-inverted range is possible, which gives a range of 110–180–270°. These transition zones do not have to be mirror-inverted.

It has been found that a lens designed in this way has good position stabilization and is particularly comfortable to wear.

It should be understood that these stabilizing means can be achieved independently of the multifocal contact lens described above with special transition between the distance part and the reading part.

The invention also relates to a method for producing a contact lens, comprising production by tuning, during which the contact lens blank is placed on a machining holder and subjected to the influence of one or more material-removing devices, In the prior art elevations and other surface irregularities were produced by means of combined turning and milling operations.

This treatment made the production of such lenses extremely expensive and placed limits on their design. Spin cast and mould cast were mentioned as alternatives. Spin casting is a method using a rotating mould, which is filled with liquid monomer material and the liquid monomer is hardened by exposure to ultraviolet light. In the mould casting process a forming die is produced by injection moulding, and the forming die is used as the mould for liquid lens material, which subsequently hardens. There is no point in such methods of production unless there are large production runs, and they are technically difficult to achieve, due to the fact that the moulds are very difficult or impossible to produce.

The object is to improve the method described above in such a way that it becomes possible in a relatively simple manner to produce small production runs or forming dies for lenses, a few contact lenses or smaller production runs.

This object is achieved with a method described above in that that during the turning the rotating lens or forming die is subjected to a to and fro movement relative to said material-removing device in the direction of the axis of rotation, in order to form at least one of the elevations, peripheral edge thickening or reading lens.

In this process the lens or forming die preferably moves to and fro with a certain frequency. and stoke, such as a frequency of maximum 200 Hz and a stroke of approximately 0.3 mm. Owing to the fact that the lens moves, and not the tool, different tools can be used for different operations.

The material-removing device can comprise a conventional tool, but it is also possible to remove material from the lens blank by means of laser light. The to and fro movement of the lens or forming die described above relative to the material movement direction can mean that the lens moves to and fro relative to the environment and a tool does not make such a movement, but the reverse—where the tool moves to and fro relative to the environment—is also possible. For the production of forming dies the cast mould or spin cast process can subsequently be used.

DESCRIPTION OF THE DRAWINGS

The invention will be explained in greater detail with reference to an exemplary embodiment illustrated in the drawing, in which:

FIG. 3 shows a perspective cross-sectional side view of the contact lens according to the invention;

FIG. 4 shows a cross-section along the line IV—IV and the vertical axis 12 of the contact lens in FIG. 2 and FIG. 1 respectively.

DETAILED DESCRIPTION OF PREFERRED EMBODIMENTS

Figure 1:
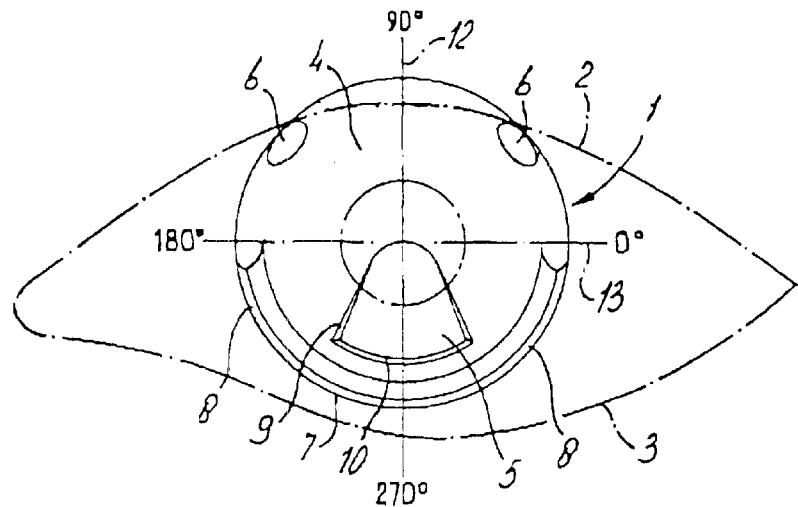
FIG. 1 shows a contact lens according to the invention in an eye with partly opened eyelids.

The contact lens according to the invention is indicated in its entirety by 1. It rests on a cornea, which is not shown in any farther detail. The upper eyelid is indicated diagrammatically by 2, and the lower eyelid by 3. The contact lens comprises a distance part 4 and a reading part 5. It should be understood that this is only an example, and the invention can also be used for other rotationally symmetrical and non-rotationally symmetrical types of lenses.

Reference number 6 indicates two elevations situated near the edge. The height thereof relative to the remaining part of the lens is less than 0.1 mm. The contact lens is also provided with a peripheral edge thickening 7 at its bottom side. As can be seen more particularly from FIG. 4, a 'trough' is situated between the peripheral edge thickening 7 and elevation 6, from which trough a transition zone 8 of relatively great length extends to the peripheral edge thickening 7.

The vertical axis of the lens is indicated by 12, and the horizontal axis by 13. Starting from the vertical axis, the top position is 0°.

The abovementioned transition zone 8 begins approximately at 0° and ends at approximately 315°, and at the other side begins at 180° and ends at 225°.

However, it is also possible to make the peripheral edge increase, thickening constantly, up to 270°, and then to make it decrease in thickness again The transitions to the high and low part of the lens respectively are sinusoidal.

The maximum thickness of the peripheral edge thickening 7 is, for example, 0.4 mm.

Figure 2:
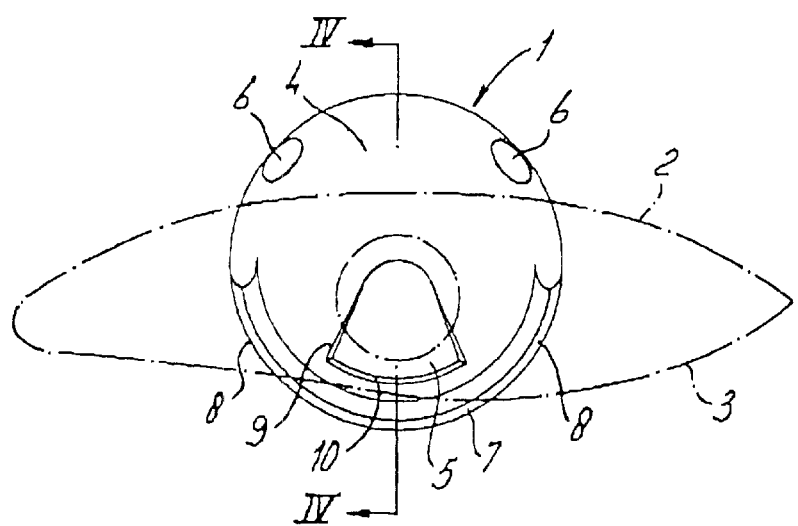
FIG. 2 shows a contact lens according to FIG. 1, where the eyelids are partly closed.

As can be seen from FIGS. 3 and 4, the reading part 5 is disposed in a special way in the lens. Unlike the prior art, this is achieved by means of a recess. The transition to this recess is shown laterally by 9 in FIG. 2 and at the bottom side by 10.

It can be seen from FIG. 4 that the transition between the distance part with radius $R_v$ and the reading part with radius $R_l$ is particularly gradual. This means that the eye will suffer little or no irritation, and wearing comfort will be increased and image discontinuity and reflection will be avoided. This design means that the lens can be made very thin, with the result that the abovementioned oxygen permeability and the wearing comfort associated therewith are optimal. Moreover, the recess produced by the provision of the reading part gives a stabilizing effect which is added to further stabilizing means, such as the ridges or peripheral edge thickenings described above.

It can also be seen from the figures that such a design can be combined particularly well with the stabilizing means described above. However, it must be understood that such a bifocal lens can also be designed without these stabilizing means, but with other stabilizing means.

Even if no peripheral edge thickening has been disposed near the bottom side of the lens, distance still remains between reading part 5 and the outer periphery of the lens in which the transition part 10 is disposed.

Figure 5:
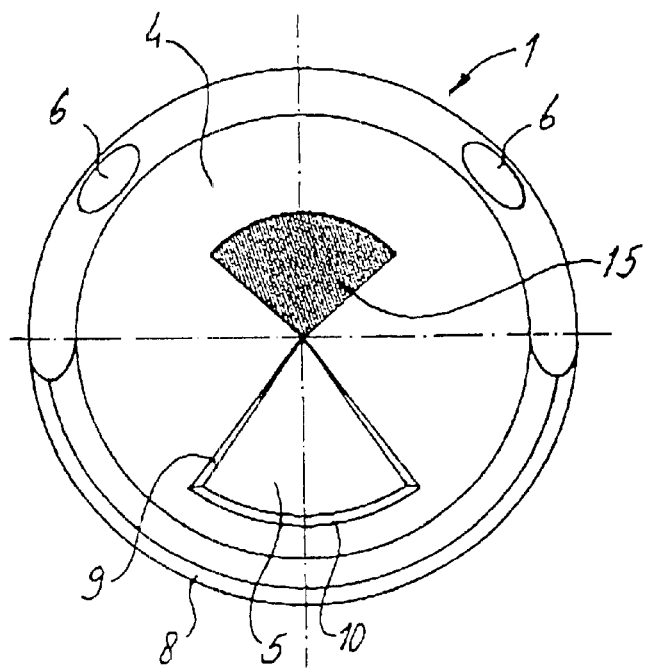
FIG. 5 shows a farther variant of the contact lens according to FIG. 1.

FIG. 5 shows a further variant of the lens according to FIG. 1. The reference numbers used there are also used here. It can be seen from the drawing that, apart from the reading part 5 used there, a further reading part 15 is present. The latter reading part extends slightly less far towards the periphery than the first reading part 5. Of course, this part can extend just as far as or even further than the first reading part 5. It has been found that the positioning of the lens on the eye becomes less critical as a result of the presence of a further reading part 15. It will therefore be understood that, although in the above example the stabilizing means according to FIG. 1 are shown in combination with the lens, other stabilizing means, such as those known in the prior art, can be used, or they can even be omitted entirely.

Figure 6:
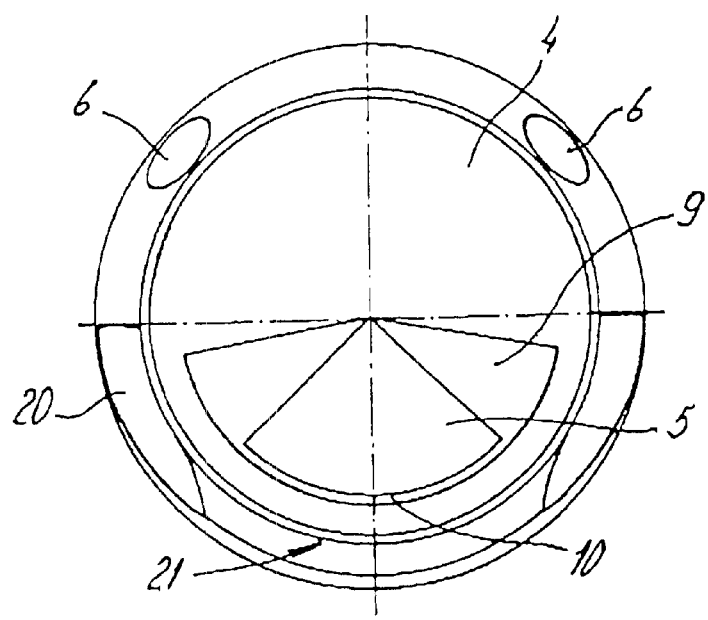
FIG. 6 shows a further variant of the contact lens according to FIG. 1.

FIG. 6 shows a further variant of an embodiment of the invention, in which the position-stabilizing means also comprise peripheral prisms 20. In this embodiment the transition part between reading part 5 and distance part 4 is made particularly broad, i.e. the surface of the parts 10, and in particular 9, is considerably enlarged compared with the earlier designs. A multifocal effect can be obtained in this way.

Furthermore, the reading part 5 is tapered to a point in this embodiment. By means of the production method proposed according to the invention, it is possible to make the boundary of the reading part any desired shape, i.e. the straight or curved lines shown here can be any shapes known in the prior art. All that is essential is that the reading part is made as a recess in the remaining part of the lens and is bounded on all sides by the remaining lens part, i.e. also at the bottom side. This 'remaining part' of the lens at the bottom side is indicated by 21 in FIG. 6.

The width of the zone 21 can have any value. Values lying between 0.1 and 1 mm are mentioned as examples.

Figure 7:
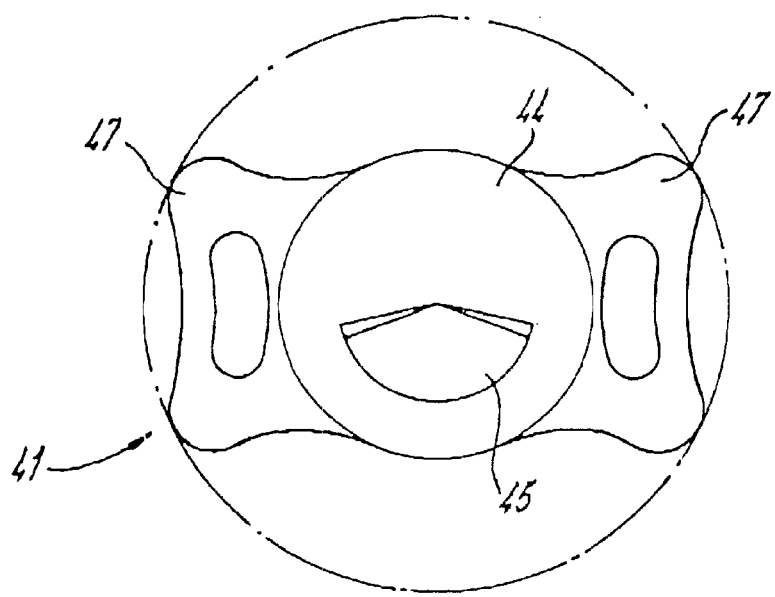
FIG. 7 shows a first embodiment of an intra ocular lens.

FIG. 7 shows a first example of an intra ocular lens. Basically such a lens can be a flat lens and does not need to be shaped corresponding to the curvature of the cornea However, the considerations given referring to FIGS. 4–6 are still true for this lens as is clear from FIG. 7.

This lens is generally referred to by 41. The distance part has reference 44 and the reading part 45, This lens is provided with two positioning members 47 to position the lens inside the human eye. The reading part 45 can be provided on either or both sides of the lens 41.

Figure 8:
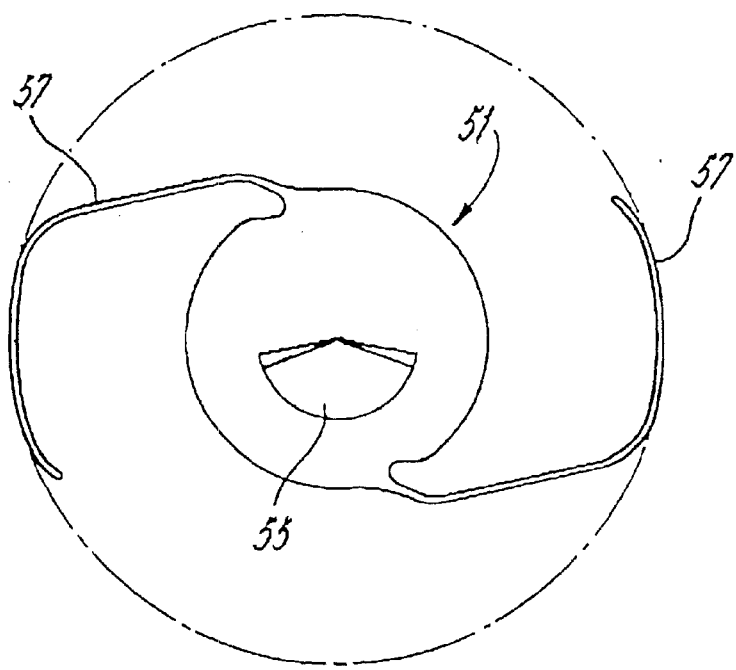
FIG. 8 shows a further variant of the intra ocular lens according to the invention.

FIG. 8 shows a further embodiment of the invention in which the lens is generally referred to by 51, The distance part has reference 54 whilst the reading part has reference 55. 57 are the locating means.

From these two variants of the locating means 47, 57 respectively it can be concluded that any location means for positioning the lens inside the eye could be appropriate, The lens as described above can be produced by, for example, turning, i.e. no operations other than turning are carried out on the lens. In order to produce reading part 5, the lens is moved to and fro in a controlled manner during the tuning, and additional material is thereby machined away only in zone 5. This means that additional material is removed only in those zones where the optical properties of the lens have to be adapted. The tool in question carries out only a conventional feed movement and does not move to and fro. The reading part 5 can consequently be produced in a particularly simple manner.

Although the invention is described above with reference to a preferred embodiment, it should be understood that numerous modifications can be made thereto without going beyond the scope of the present application. Other types of lenses can be achieved from the stabilization described above or the design described above by recessing parts in the lens material. Moreover, the lens can also be produced by the spin cast or mould cast process, instead of by the turning operation described above.

What is claimed is:

1. Multifocal contact lens provided with a reading portion in the lower lens part and another lens portion in its upper part, wherein the reading portion comprises a recess which is bounded on all sides by the remaining lens part, and in that the outer limit of the reading portion lies on or within an imaginary sphere having its origin and radius of curvature coinciding with the radius $R_v$ of said other lens portion.

2. Multifocal lens according to claim 1, in which the other portion of the lens is in the form of a distance lens.

3. Multifocal contact lens according to claim 2, in which the reading portion comprises at least 25% and maximum 50% of the surface area of the remaining lens part.

4. Multifocal contact lens according to claim 3, in which the transition portion comprises at least 10% and maximum 30% of the surface area of the remaining lens part.

5. Multifocal contact lens according to claim 1, comprising a reading portion, in which a further reading portion is present, lying opposite said reading portion.

6. Multifocal contact lens according claim 1, which is not rotationally symmetrical and is provided with position-stabilizing means, in order to stabilize the use position of the lens on the cornea, which means comprise at least two elevations, in which:

said elevations are provided above the horizontal axis of the lens, said elevations are a height of between 0.05 and 0.1 mm, and further stabilizing means are present, disposed in the bottom part of the lens and comprising a part with increased weight.

7. Multifocal contact lens according to claim 6, in which said further stabilizing means comprise ridges.

8. Multifocal contact lens according to claim 6, in which said further stabilizing means comprise a peripheral prism.

9. Multifocal contact lens according to claim 6, in which said further stabilizing means comprise a peripheral edge thickening.

10. Multifocal contact lens according to claim 9, in which a bevelled transition zone (8) is provided between the peripheral part not provided with a thickening and the peripheral part provided with a thickening.

11. Multifocal contact lens according to claim 9, in which the height of the thickening lies between 0.1 and 0.4 mm.

12. Multifocal contact lens according to claim 10, in which the length of the transition zone (8) lies between +20–+90° and 260°, the top side of the vertical axis being the 0° point.

13. Multifocal intraocular lens provided with a reading portion in the lower lens part and another lens portion in its upper part, wherein the reading portion comprises a recess which is bounded on all sides by the remaining lens part, and in that the outer limit of the reading portion lies on or within an imaginary sphere having its origin and radius of curvature coinciding with the radius $R_v$ of said other lens portion.

14. Multifocal lens according to claim 13, in which the other portion of the lens is in the form of a distance lens.

15. Multifocal intraocular lens according to claim 13, in which the other portion of the lens is in the form of a distance lens.

16. Multifocal intraocular lens according to claim 15, in which the reading portion comprises at least 25% and maximum 50% of the surface area of the remaining lens part.

17. Multifocal intraocular lens according to claim 16, in which the transition portion comprises at least 10% and maximum 30% of the surface area of the remaining lens part.

18. Multifocal intraocular lens according to claim 15, comprising a reading portion, in which a further reading portion is present, lying opposite said reading portion.

19. Multifocal intraocular lens according to claim 15, comprising location means.

20. Multifocal intraocular lens according to claim 13, in which the length of the transition zone (8) lies between +20–+90° and 260°, the top side of the vertical axis being the 0° point.

21. Method for the production of a multifocal lens, comprising producing by turning, in which the lens blank is placed on a rotating machining holder and subjected to the influence of one or more material-removing devices, wherein during the turning the rotating lens and said material-removing device are subject to a relative movement to each other in the direction of the axis of rotation, in order to form at least one of the elevations, peripheral edge thickening or reading lens.

22. Method according to claim 20, in which the relative movement has a frequency of approximately 200 Hz and a stroke of maximum approximately 0.3 mm.

23. Method according to claim 20, in which said material-removing device comprises a tool.

24. Method according to claim 20, in which said material-removing device comprises a laser beam device.

25. An ocularly supported multifocal corrective lens comprising:
  a) a reading portion, the lens being stabilized for the reading portion to be disposed in a lower part of the lens;
  b) another lens portion; and
  c) a convexly curved outer surface;
wherein the reading portion comprises a recess extending inwardly of the outer surface and surrounded by the other lens portion and wherein the lens is made in one-piece of one material.

26. A corrective lens according to claim 25 comprising a contact lens.

27. A corrective lens according to claim 25 comprising an intraocular lens.

* * * * *